United States Patent [19]
Hägeli

[11] Patent Number: 5,884,886
[45] Date of Patent: Mar. 23, 1999

[54] SUPPORT FRAME FOR A STRUCTURAL COMPONENT

[75] Inventor: Heinz Hägeli, Würenlos, Switzerland

[73] Assignee: Asea Brown Boveri AG, Baden, Switzerland

[21] Appl. No.: 832,159

[22] Filed: Apr. 2, 1997

Related U.S. Application Data

[63] Continuation of Ser. No. 375,404, Jan. 18, 1995, abandoned.

[30] Foreign Application Priority Data

Feb. 26, 1994 [EP] European Pat. Off. ............. 94102937

[51] Int. Cl.$^6$ .................................................. A47B 91/00
[52] U.S. Cl. ..................................... 248/346.01; 248/562
[58] Field of Search .................................. 248/678, 676, 248/679, 346.01, 672, 673, 618, 581, 562; 108/51.1, 56.1; 52/167.3, 167.4, 636, 638

[56] References Cited

U.S. PATENT DOCUMENTS

| | | | |
|---|---|---|---|
| 2,117,919 | 5/1938 | Summers ................................. | 248/581 |
| 2,210,051 | 8/1940 | Woodbury .............................. | 248/562 |
| 2,441,509 | 5/1948 | Robinson ................................ | 248/678 |
| 2,441,510 | 5/1948 | Robinson ............................ | 248/678 X |
| 2,454,538 | 11/1948 | Bazley et al. ....................... | 248/678 X |
| 3,157,423 | 11/1964 | Brie, Sr. ............................. | 108/51.1 X |
| 3,215,897 | 11/1965 | Hertig et al. ............................ | 317/103 |
| 3,294,041 | 12/1966 | Lessheim ............................... | 108/51.1 |
| 3,469,809 | 9/1969 | Reznick et al. ........................ | 248/678 |
| 3,789,174 | 1/1974 | Barkan et al. ..................... | 52/167.4 X |
| 3,851,430 | 12/1974 | Schuster ..................................... | 52/108 |
| 3,891,862 | 6/1975 | Clark .................................. | 361/603 X |
| 4,023,394 | 5/1977 | Borup ....................................... | 72/457 |
| 4,093,164 | 6/1978 | Borreson .................................. | 248/20 |
| 4,577,826 | 3/1986 | Bergstrom et al. ................. | 361/602 X |
| 5,024,002 | 6/1991 | Possati ................................... | 248/676 |

FOREIGN PATENT DOCUMENTS

| | | | |
|---|---|---|---|
| 123618 | 3/1947 | Australia ................................ | 248/618 |
| 506796 | 3/1953 | Belgium ................................ | 361/602 |
| 2537231 | 6/1984 | France . | |
| 157324 | 6/1939 | Germany ............................... | 248/573 |
| 1204301 | 11/1965 | Germany . | |
| 2623178 | 1/1978 | Germany . | |
| 5278743 | 10/1993 | Japan .................................... | 108/51.1 |
| 678571 | 8/1979 | U.S.S.R. ................................ | 361/602 |
| 265360 | 2/1927 | United Kingdom . | |
| 1120107 | 7/1963 | United Kingdom . | |
| 15791 | 12/1971 | United Kingdom ................... | 248/618 |

OTHER PUBLICATIONS

Beer and Johnson, Jr., *Mechanics of Materials*, 1981, pp. 407, McGraw–Hill, Inc.

Grafstein & Schwarz, *Pictorial Handbook Of Technical Devices*, 1971, pp. 114, 115, Chemical Publishing Co., Inc.

*Primary Examiner*—Leslie A. Braun
*Assistant Examiner*—Anita M. King
*Attorney, Agent, or Firm*—Burns, Doane, Swecker & Mathis, L.L.P.

[57] ABSTRACT

The support frame according to the preferred embodiments of the invention reduces the abrupt strains acting upon a foundation to such an extent that light and hence more economical foundations for the device secured to the support frame can be used. A preferred embodiment of the support frame includes at least two resiliently embodied girders and at least one crossbar connecting said girders. At least one securing point is provided on the girders or the crossbar for receiving a structural component to be supported. At least one connecting point is provided on each of the girders, for connecting the girder to a foundation. An interstice is provided between the respective girders and the foundation, wherein the interstice is bridged only at the at least one connecting point. The resilient girders and the interstice allow the impact upon the foundation to be dampened.

12 Claims, 2 Drawing Sheets

SUPPORT FRAME FOR A STRUCTURAL COMPONENT

This application is a continuation, of application Ser. No. 08/375,404, filed Jan. 18, 1995 now abandoned.

BACKGROUND OF THE INVENTION

1. Field of the Invention

The present invention relates to a support frame, and more particularly to a support frame for receiving a structural component to be supported.

2. Description of the Related Art

A support frame for structural components is disclosed in European Patent Disclosure EP 0 129 216 B1. This support frame rests directly on a foundation and is rigidly joined to the foundation without any space between the foundation and the support frame. The structural component such as a metal-encapsulated, gas-insulated switch unit is supported on the support frame. The support frame receives the entire weight of this structural component and transmits it directly to the foundation. In addition, when switching of the switch unit occurs, the reaction forces engendered by the masses in motion of the switch devices, particularly those of the power switches, which are disposed with a vertical longitudinal axis, are transmitted undamped to the foundation. As a result, the foundation must be comparatively robust in dimensions, so that over the long term it can withstand these sudden strains.

OBJECTS AND SUMMARY OF THE INVENTION

An object of the preferred embodiments of the invention is to create a support frame for a device that reduces the intensity of the reaction forces acting abruptly upon the foundation that receives the support frame.

The support frame according to the preferred embodiments of the invention reduces the essential abrupt strains, i.e. impact strains, acting upon the foundation to such an extent that light and hence more economical foundations for the device secured to the support frame can be used.

A preferred embodiment of the support frame includes at least two resiliently embodied girders and at least one crossbar connecting said girders. At least one securing point is provided on the girders or the crossbar for receiving the structural component to be supported. At least one connecting point is provided on each of the girders, for connecting the girder to a foundation. An interstice is provided between the respective girders and the foundation, wherein the interstice is bridged only at the at least one connecting point.

BRIEF DESCRIPTION OF THE DRAWINGS

Preferred embodiments of the invention are illustrated in the accompanying drawings in which like elements bear like reference numerals, and wherein.

DESCRIPTION OF THE PREFERRED EMBODIMENT

Figure 1:
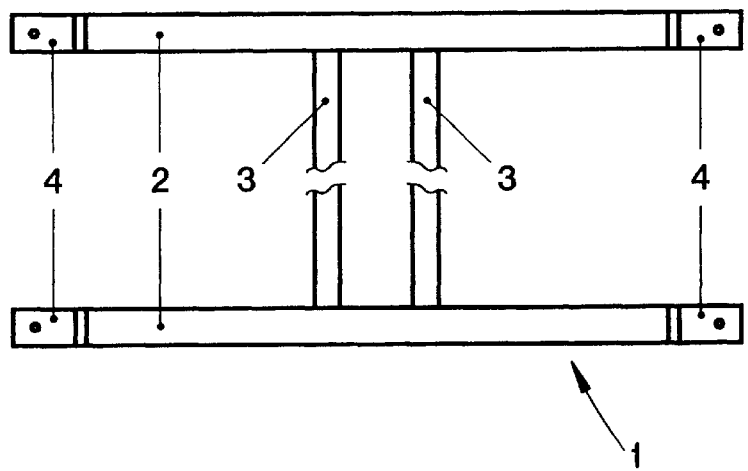
FIG. 1 is a schematic top view of a first embodiment of a support frame according to the invention.
Figure 2:
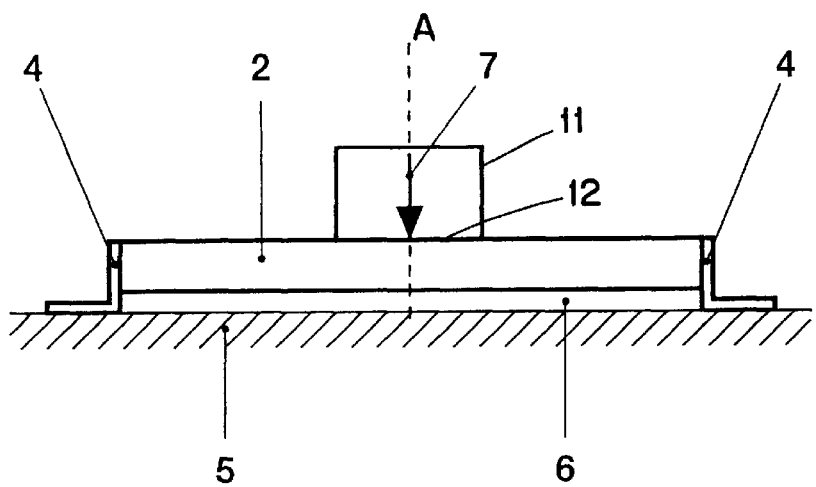
FIG. 2 is a side view of the support frame of FIG. 1.

FIGS. 1 and 2 schematically show a support frame 1 for supporting a device. The support frame 1 of the preferred embodiment includes two girders 2, which are made from a metal profile section. The two girders 2 are connected by at least one and preferably two crossbars 3. Angle profile sections 4 are secured on each end of the girders 2.

Figure 4A:
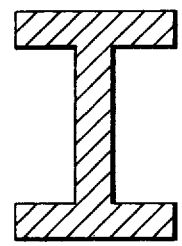
FIG. 4a is a cross sectional view of a first embodiment of the girders according to the invention.
Figure 4B:
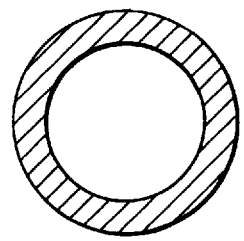
FIG. 4b is a cross sectional view of a second embodiment of the girders according to the invention.
Figure 4C:
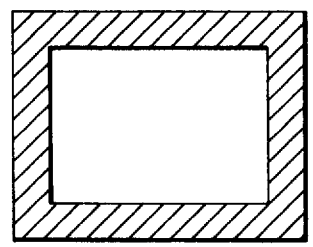
FIG. 4c is a cross sectional view of a third embodiment of the girders according to the invention.

The two girders 2 extend parallel to one another and may be made of any suitable supporting material. The cross sections of the girders 2 are preferably I-shaped sections or tube profiles. The tube profiles may have a round or rectangular cross section. FIGS. 4a–4c illustrate I-shaped, round, and rectangular girder cross sections. However, other girder cross-sections which provide the necessary strength and resilience may also be used.

The crossbars 3 which connect the two girders 2 are provided as a securing point 12 for receiving the structural component 11 to be supported on the frame 1. Holes are provided in the crossbars for used in securing the structural component to the support frame 1.

The angle profile sections 4, which are best seen in FIG. 2, serve as connecting points for securing the ends of the support frame 1 to a foundation 5. The angle profile sections 4, support the frame 1 with an interstice or gap 6 provided between the girders 2 and the foundation 5. The girders 2 are preferably resilient. The interstice 6 is provided between the girders 2 and the foundation 5 to allow a spring like flexing of the girders. Only the angle profile sections 4 of the support frame 1 rest on the foundation 5.

An arrow 7, in FIG. 2, indicates the direction and location of force of the load acting upon the support frame 1, and any superimposed reaction forces. Care should be taken to assure that the load rests in the region near the middle of the girders 2.

A number of different embodiments of the support frame 1 are within the scope of the invention. It is entirely possible to use only a single girder 2, embodied somewhat wider if necessary, and to provide the securing point for receiving the supported device directly on the girder. In the case of support frames 1 with crossbars 3, it is also possible to provide resilient crossbars 3, so that the girders 2 are resiliently held together with the crossbars 3. Further, stops connected to the foundation 5 may be provided within the interstice 6, to limit the spring reciprocation of the girders 2. Such a stop can be provided by the surface of the foundation 5 itself, if the height of the interstice 6 is dimensioned precisely to limit the spring reciprocation of the girders 2.

Figure 3:
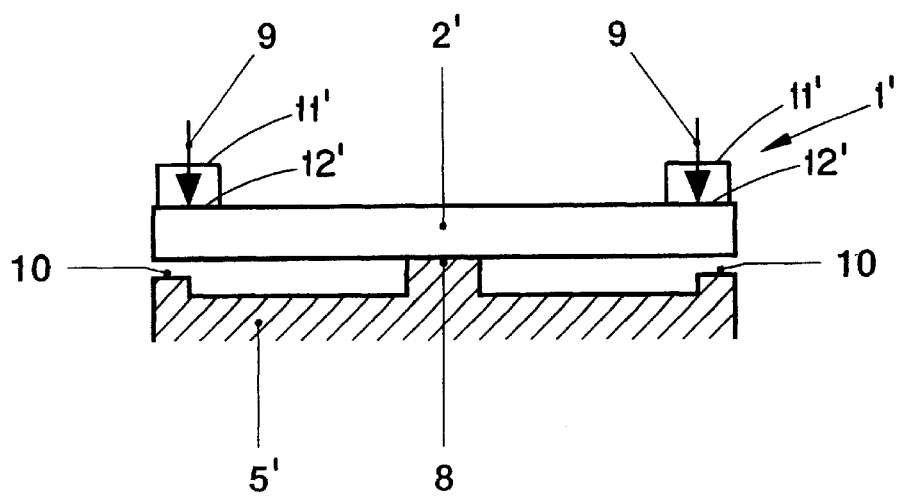
FIG. 3 is a schematic side view of a second embodiment of a support frame according to the invention.

FIG. 3 is a side view of a second embodiment of the present invention. The support frame 1' includes at least one girder 2'. The support frame 1' has only one non-positive securing means 8, acting as a connecting point for connecting the support frame 1' to the foundation 5'. The securing means 8 is provided approximately in the middle of the girder 2'. Arrows 9 in the region of the ends of the girder 2' indicate the direction of force of the load of a component 11 acting upon the support frame 1' at a securing point 12' as well as any superimposed reaction forces. Under each of the ends of the girder 2' there is a stop 10, which may be connected to or separate from the foundation 5'. The stops 10 limit the flexing of the girder 2'. The stops also prevent tilting of the support frame with the device secured on it in the event of an earthquake. The stop 10 can be made from an elastic or a non-elastic material.

The support frame 1, 1' of either of the two embodiments discussed above is especially suitable for securing structural components of a gas-insulated switch system which, with the aid of the support frame 1, 1', are combined into units for transportation purposes. The resiliently embodied girders 2, 2' are especially advantageous for structural components such as switch devices 11 whose longitudinal axis A extends vertically, perpendicular to the support frame 1, 1'. In such switch devices, the masses in motion move essentially vertically, in the direction of the longitudinal axis. The reaction forces produced during switching by the acceleration and deceleration of the masses in motion act abruptly upon the foundation 5, 5', via the support frame 1, 1'.

Previously, the foundation had to be designed not only to receive the weight of the structural component but also to absorb the impact produced by acceleration and deceleration of the masses. These impacts are damped by means of the resiliently embodied girders 2, 2' to such an extent that the additional load on the foundation 5, 5' caused by them is negligible. The foundation 5, 5' used in conjunction with the present invention can now be designed for lesser loads and thus produced more economically. Power switches in gas-insulated switch systems as a rule have the greatest masses, which are moved at the highest speeds. Nevertheless, the support frame 1, 1' can be designed in such a way that even the reaction forces caused by power switches are satisfactorily damped.

For instance, if a structural component, equipped with vertically disposed power switches, of a gas-insulated switch system is mounted on a support frame 1, 1', then in simplified terms this arrangement can be considered to be a single-mass oscillator. In this single-mass oscillator, the support frame 1, 1' represents the spring, and the structural component represents the mass in repose that oscillates after excitation with the spring. The mass is incited to oscillate by pulse like accelerations caused by switching switch events and by deceleration of the masses in motion of the power switches. The differential equation that describes this process takes the following form:

$$m\ddot{x}+kx=F(t)$$

Solving this differential equation results in a function that can be shown as follows:

$$K=K(\beta)$$

The dimensionless parameter K, which can be considered a dynamic heightening factor, is defined as follows:

$$K = \frac{\text{switching force resulting from the mass in motion}}{\text{force resulting from the mass in repose}}$$

The dimensionless parameter $\beta$, which can be considered a frequency factor, is defined as follows:

$$\beta = \frac{\text{pulse length of the switching force}}{\text{natural frequency of the mass in repose}}$$

The spring characteristic of the support frame 1, 1' can be optimized, for instance by a suitable choice of material, in such a way that the reaction forces acting upon the foundation 5, 5' and originating in the switching force caused by the masses in motion, become minimal. Therefore, it is sufficient to design the foundation 5, 5' to support the other loads to be transmitted by the support frame, such as the intrinsic weight of the structural component, load caused by wind pressure, seismic load, etc. The foundation 5, 5' can therefore be produced in substantially less robust form and hence more economically.

While this invention has been described in accordance with certain preferred embodiments, it is recognized that variations and changes may be made without departing from the scope of the invention as set forth in the claims.

I claim:

1. A support frame in combination with a structural component comprising:

two resiliently embodied girders having a length;

at least one crossbar connecting said girders;

at least one securing point provided on said girders or said crossbar receiving the structural component to be supported;

at least one connecting point provided on each of said girders, for connecting said girders to a foundation such that an interstice is provided between said girders and the foundation, and wherein the interstice is bridged only at the at least one connecting point in an unloaded condition;

said resiliently embodied girders having a loaded condition in which a portion of the girders extends into the interstice and said unloaded condition in which the girders are located entirely outside of the interstice; and said structural component supported on said support frame at a distance from said at least one connecting point about one half said girder's length, said support frame including a longitudinal axis disposed perpendicularly to the support frame and whose masses in motion move essentially in the direction of the longitudinal axis causing the resilient girders to flex between the loaded and unloaded conditions, wherein vibrations of the girders between the loaded and unloaded conditions are damped by the resilience of the girders.

2. The support frame of claim 1, wherein said girders have cross sections of any one of the following shapes I-shaped, round, and rectangular.

3. The support frame of claim 1, wherein said at least one securing point is provided in the region of the middle of the girders, and said at least one connecting point is provided at the end of the girders.

4. The support frame of claim 3, further comprising at least one angled member connected to each of the girders at said at least one connecting point.

5. The support frame of claim 1, wherein connecting points are provided on each end of the girders, and the securing point is provided in the region of the middle of the girders.

6. The support frame of claim 1, wherein said at least one securing point is provided on the at least one crossbar.

7. A support frame in combination with a structural component comprising:

two resiliently embodied girders;

at least one crossbar connecting said girders;

at least one securing point provided on said girders or said crossbar receiving the structural component to be supported;

at least one connecting point provided on each of said girders, for connecting said girders to a foundation such that an interstice is provided between said girders and the foundation, and wherein the interstice is bridged only at the at least one connecting point in an unloaded condition;

said resiliently embodied girders having a loaded condition in which a portion of the girders extends into the interstice and said unloaded condition in which the girders are located entirely outside of the interstice; and said structural component supported on said support frame at a distance from said at least one connecting point about one half said girder's length, said support frame including a longitudinal axis disposed perpendicularly to the support frame and whose masses in motion move essentially in the direction of the longitudinal axis causing the resilient girders to flex between the loaded and unloaded conditions, wherein vibrations of the girders between the loaded and unloaded conditions are damped by the resilience of the girders; wherein said structural component comprises a power switch.

8. A support frame in combination with a structural component comprising:

a resilient girder having a length, means for securing said structural component on the girder, and a longitudinal axis along said girder length;

a foundation for supporting the girder;

the foundation having a means for connecting said foundation to said girder engaging said girder;

a portion of the girder being spaced from the foundation to provide an interstice between the girder and the foundation and the means for securing being spaced on the girder along said girder longitudinal axis from the means for connecting;

said resilient girder having a loaded condition in which a portion of the girder extends into the interstice and an unloaded condition in which the girder is located entirely outside of the interstice;

the interstice being bridged in the unloaded condition only at the means for connecting, whereby the girder may flex in response to a load applied at the means for securing; and said structural component secured on said girder at a distance from said means for connecting about one half said girder length by said means for securing, said structural component having a longitudinal axis disposed substantially perpendicular to the girder longitudinal axis and having masses in motion which move essentially along said structural component longitudinal axis causing the resilient girder to move between the loaded and unloaded conditions, wherein vibrations of the girder between the loaded and unloaded conditions are damped by the resilience of the girder.

9. The support frame of claim 8, further comprising a stop located adjacent each end of said girder and connected to the foundation, wherein said stops limit the deflection of the girder.

10. The support frame of claim 9, wherein the stops are fabricated from an elastic material.

11. The support frame of claim 8, wherein the means for securing is provided in a region of the middle of said girder, and the connecting means for is provided on an end of said girder.

12. The support frame of claim 8, wherein means for securing are provided on each end of said girder, and the connecting means is provided in a region of the middle of said girder.

* * * * *